UNITED STATES PATENT OFFICE.

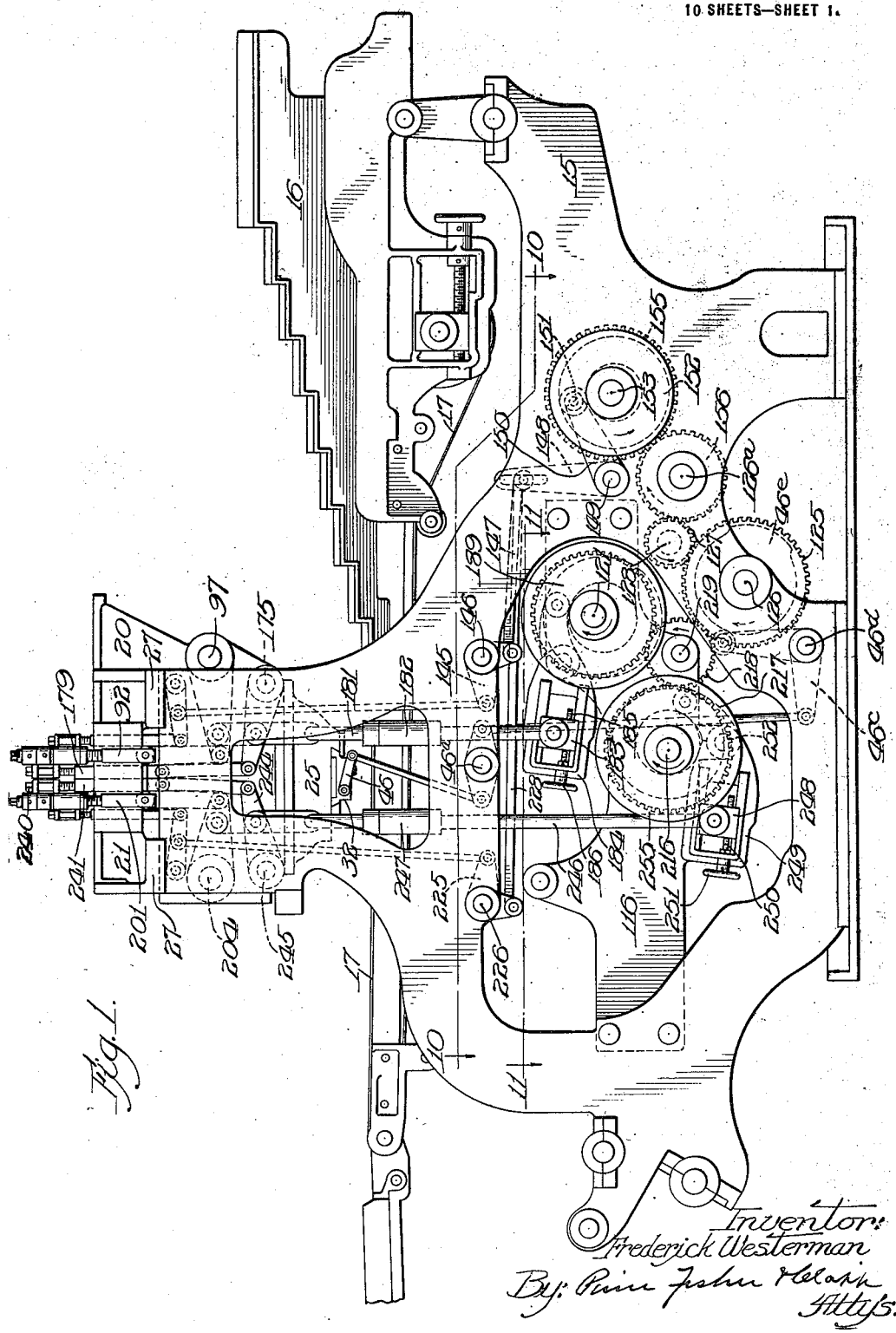

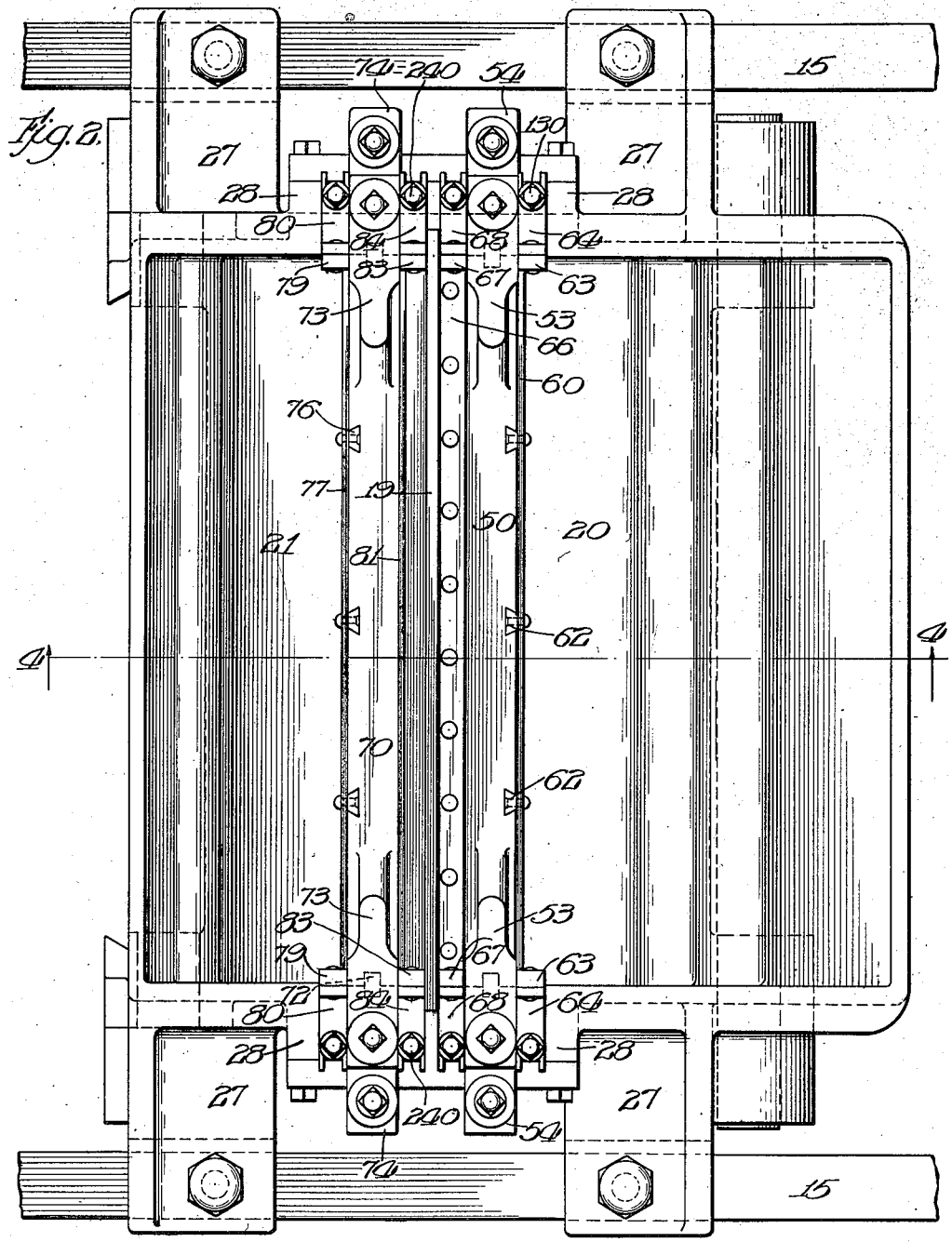

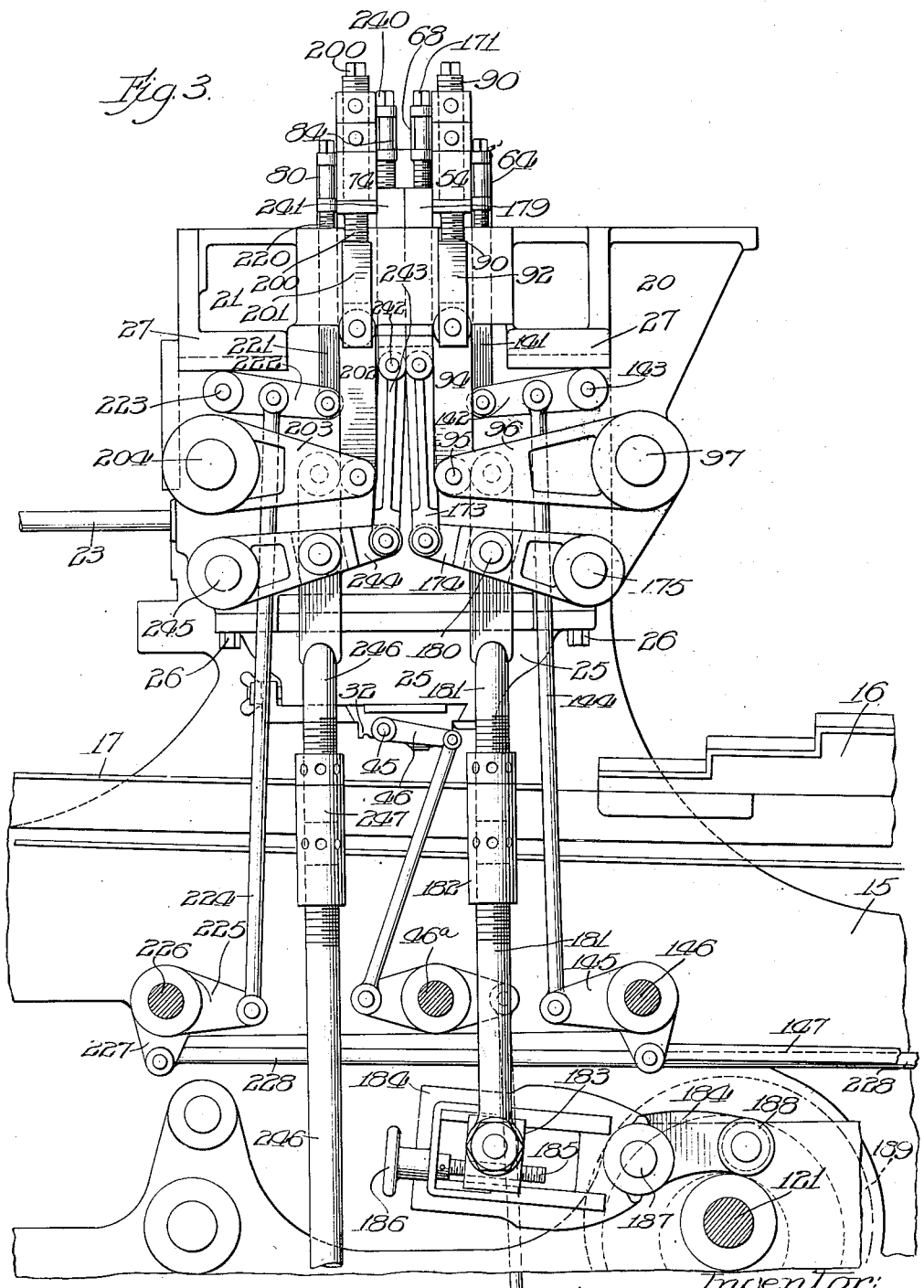

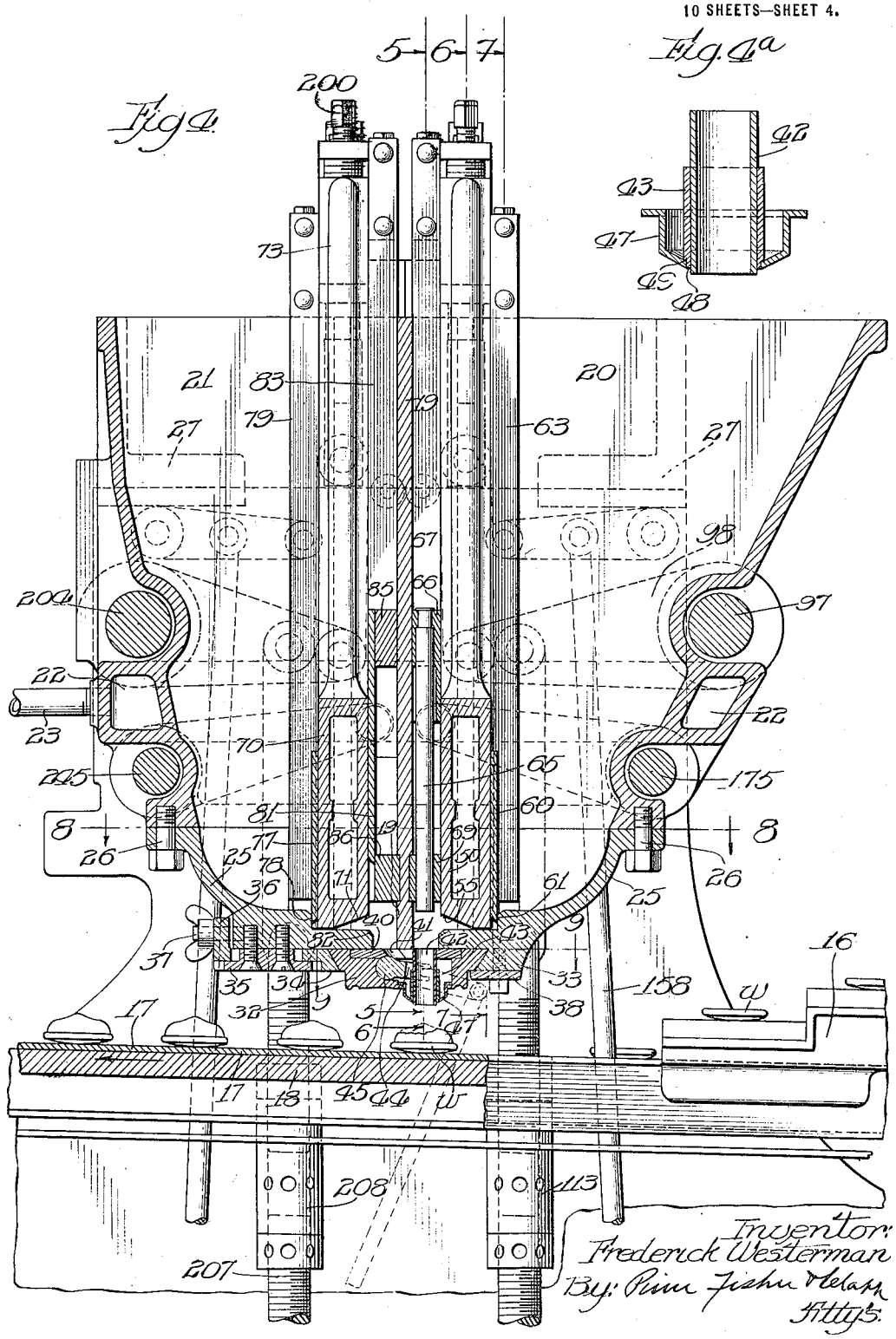

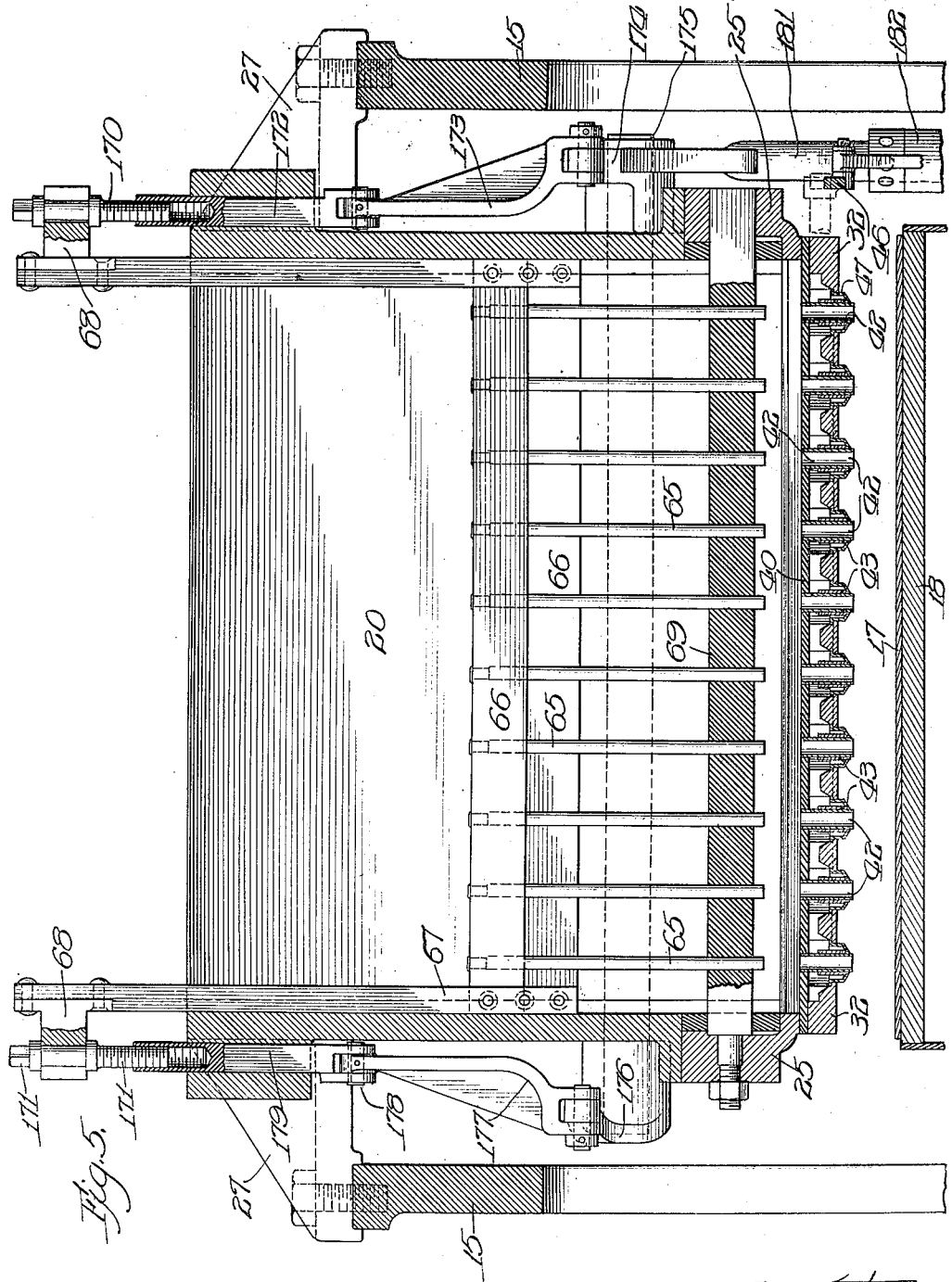

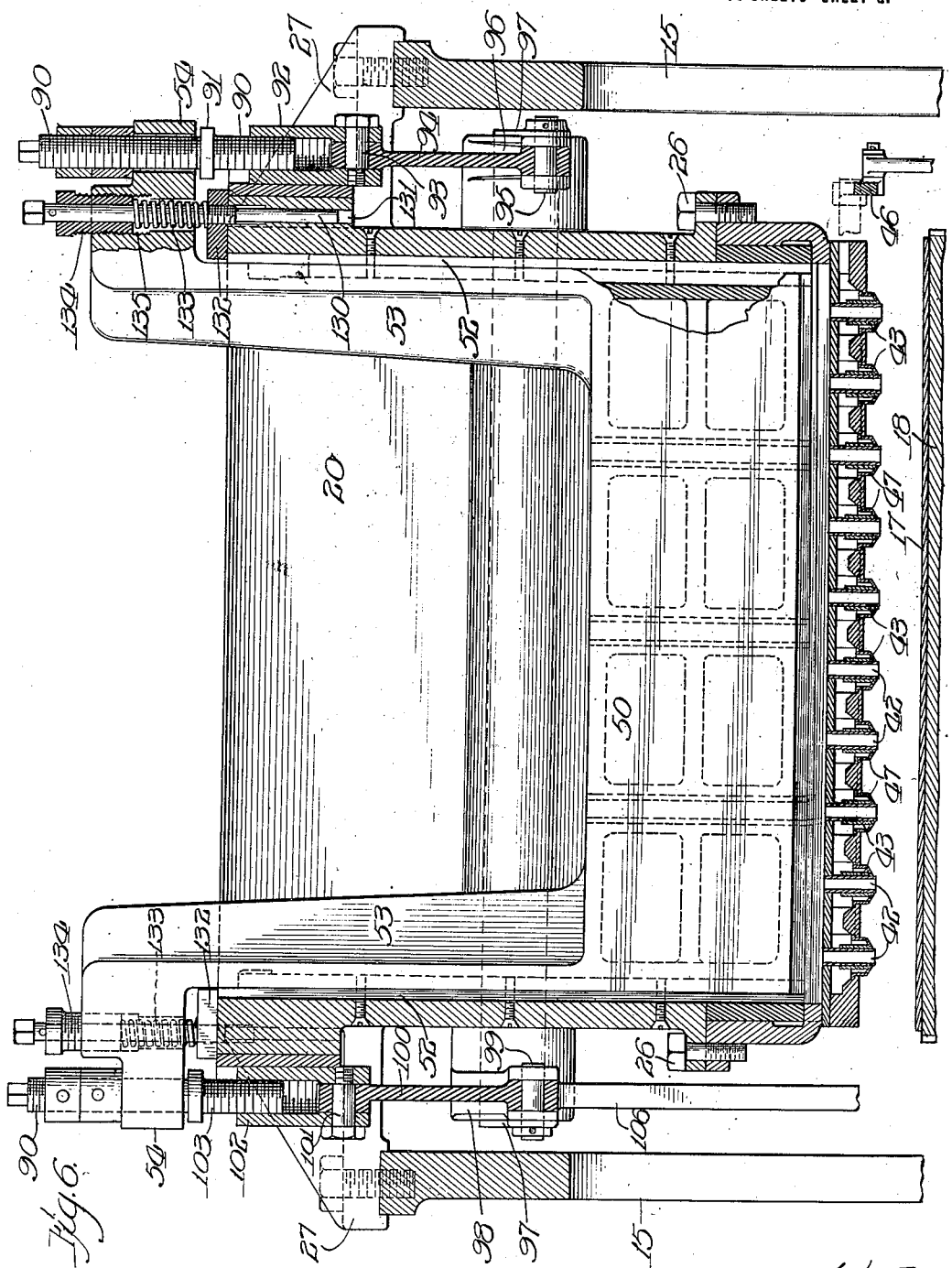

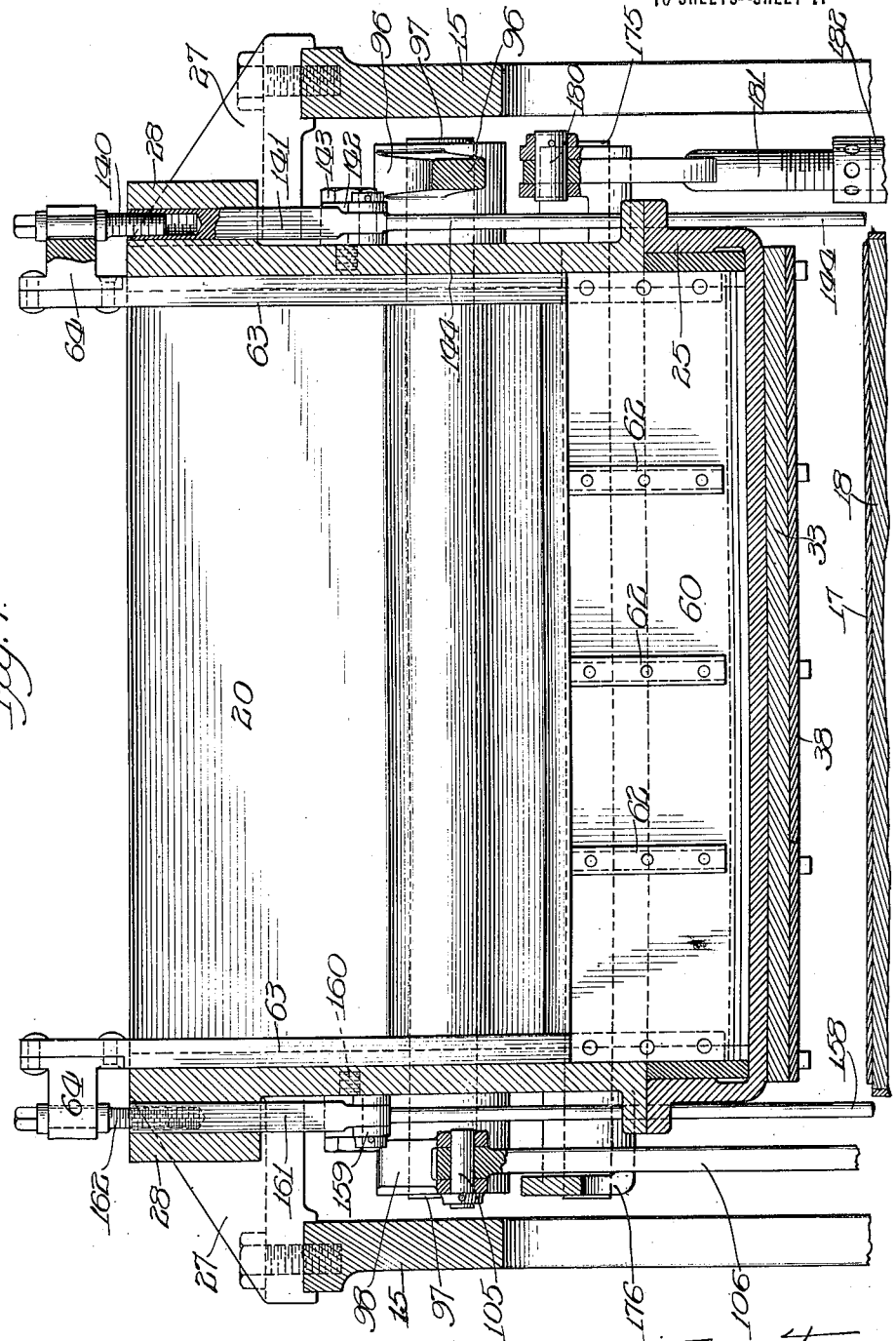

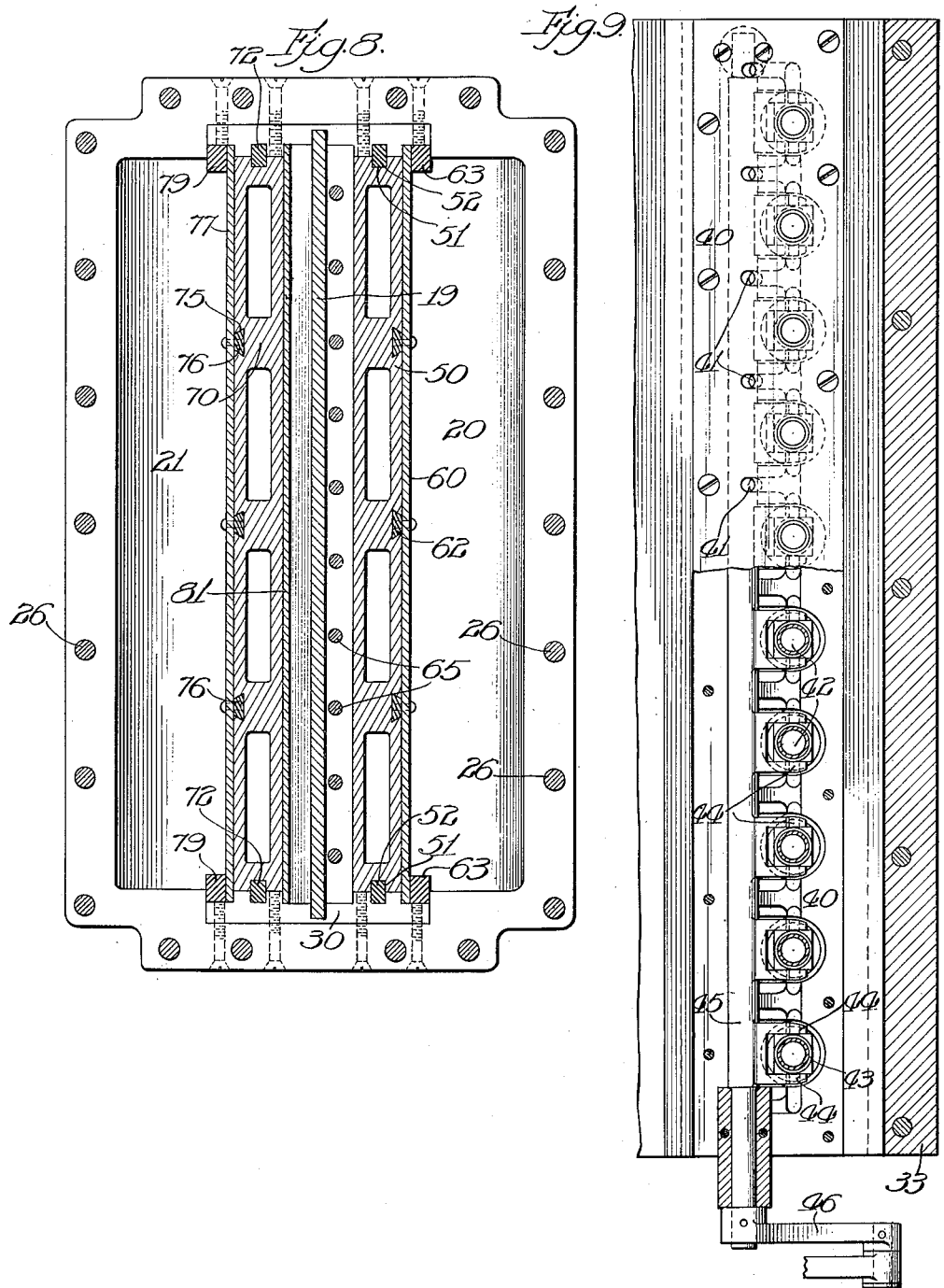

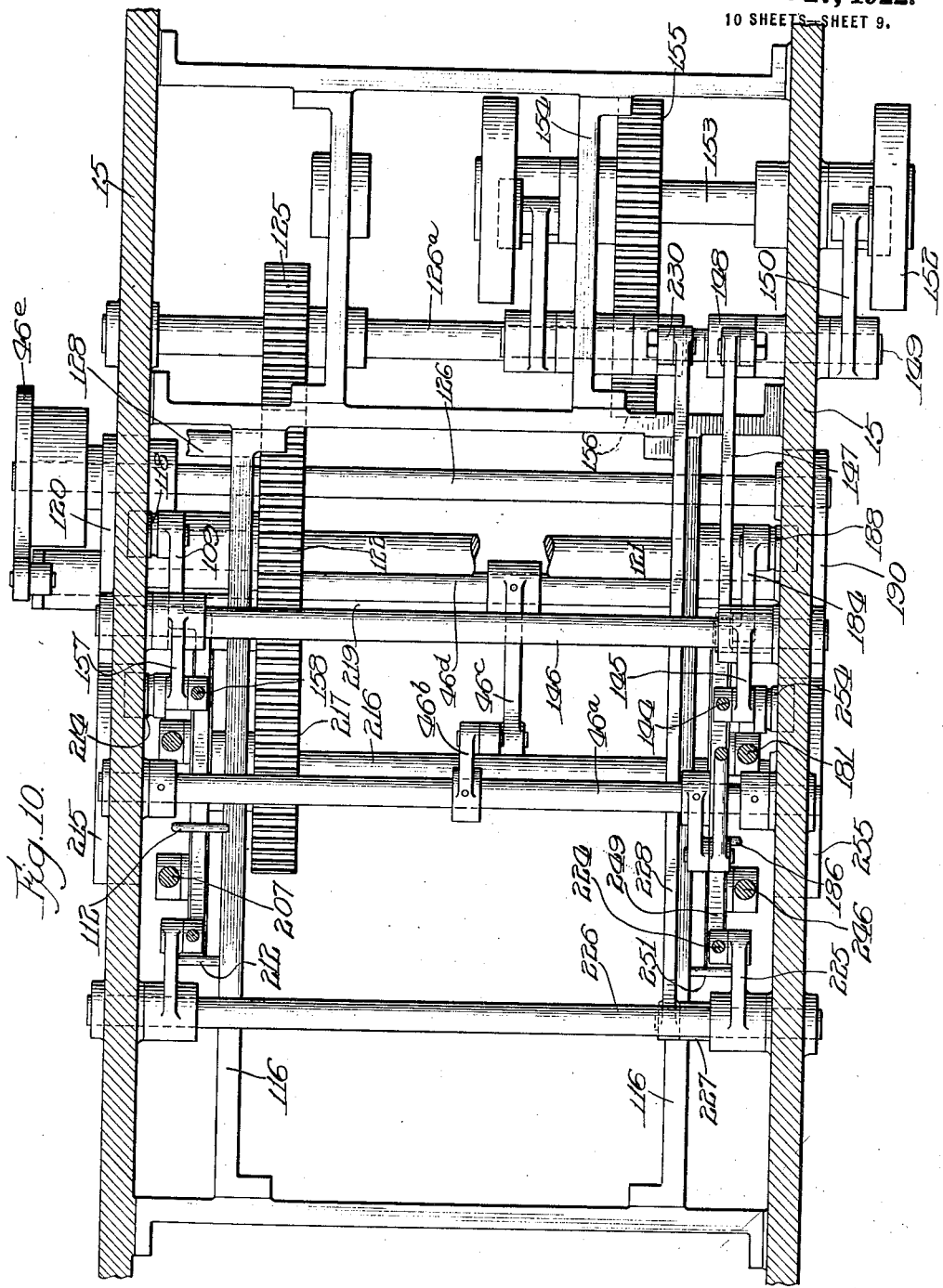

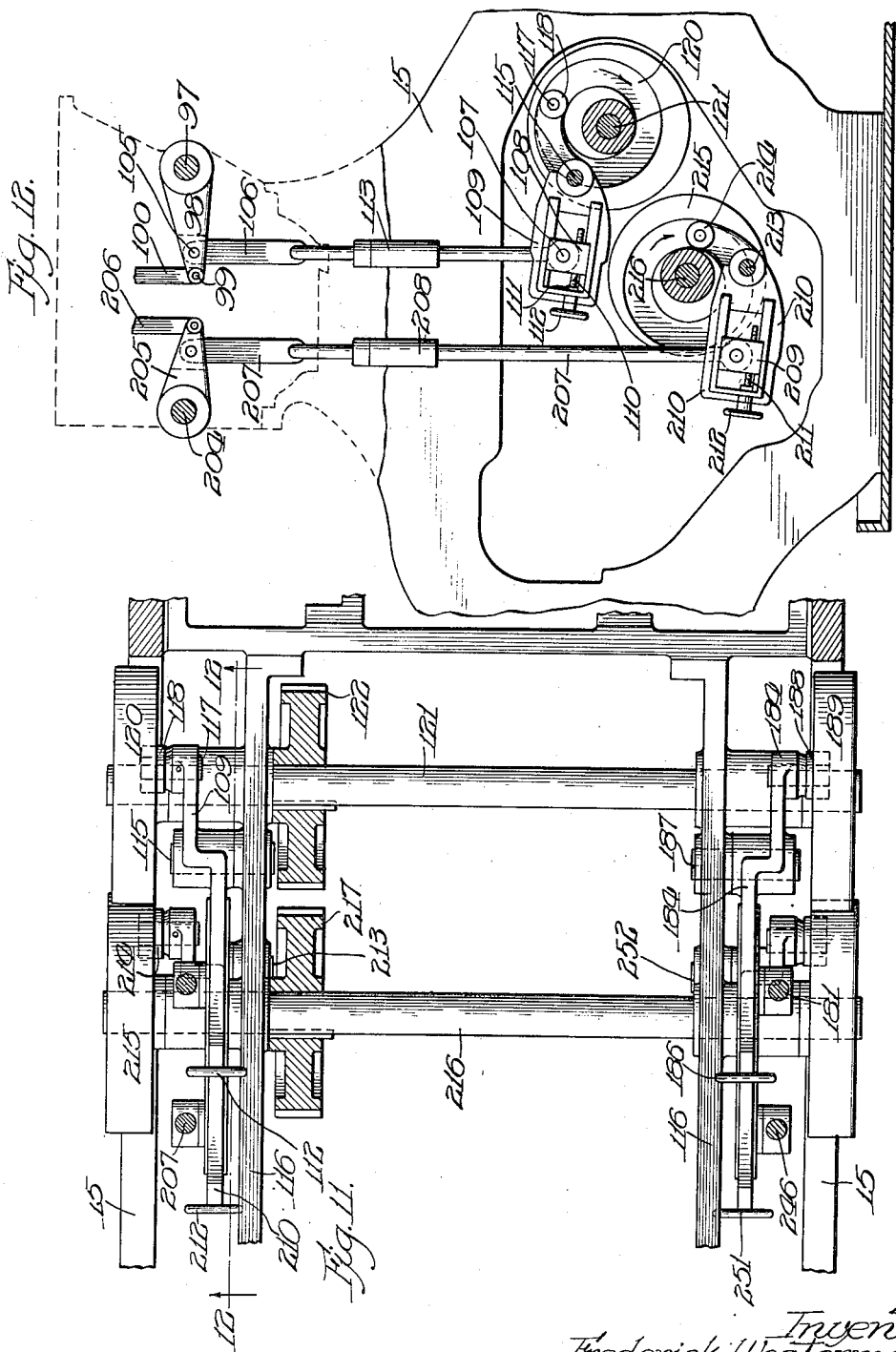

FREDERICK WESTERMAN, OF CHICAGO, ILLINOIS.

DEPOSITING MACHINE.

1,420,797.                Specification of Letters Patent.    Patented June 27, 1922.

Application filed May 22, 1918. Serial No. 235,927.

*To all whom it may concern:*

Be it known that I, FREDERICK WESTERMAN, a citizen of the United States, residing at Chicago, in the county of Cook and State of Illinois, have invented certain new and useful Improvements in Depositing Machines, of which I do declare the following to be a full, clear, and exact description, reference being had to the accompanying drawings, forming part of this specification.

The present invention has relation to machines for depositing material upon cakes or like articles that are fed in rows beneath a receptacle wherein the depositing material is contained. An example of the type of machine to which my invention particularly relates is shown in Letters Patent No. 1,121,430, granted to me December 15, 1914, and reference to such patent is specifically made, as certain parts of the machine hereinafter described are more fully illustrated in such patent and hence are not described in detail herein.

The invention of the present application is directed more specifically to improved means for delivering material from the receptacle onto the cakes to be coated and the invention consists in the features of novelty hereinafter described, illustrated in the accompanying drawings and particularly pointed out in the claims at the end of the specification.

Figure 1 is a view in side elevation of a machine having my invention applied thereto. Figure 2 is a plan view upon an enlarged scale of a receptacle for containing material to be deposited, together with parts of the mechanism contained therein. Figure 3 is a view in end elevation of a receptacle for containing the material to be deposited, showing also parts of the mechanism at such end of the receptacle for operating certain of the valves, etc. within said receptacle. Figure 4 is a view in vertical section on line 4—4 of Fig. 2. Figure 4ᵃ is an enlarged detail view in vertical section through one of the discharge nozzles at the bottom of the receptacle. Figure 5 is a view in vertical section on line 5—5 of Fig. 4. Figure 6 is a view in vertical section on line 6—6 of Fig. 4. Figure 7 is a view in vertical section on line 7—7 of Fig. 4. Figure 8 is a view in horizontal section on line 8—8 of Fig. 4. Figure 9 is a view in horizontal section on line 9—9 of Fig. 4. Figure 10 is a view in horizontal section on line 10—10 of Fig. 1. Figure 11 is a view in horizontal section on line 11—11 of Fig. 1, parts being omitted. Figure 12 is a view in vertical section on line 12—12 of Fig. 11.

While I have illustrated in the accompanying drawings and shall describe in the following specification what I regard as the preferred form of my invention and have shown the same as applied to one type of machine, I do not wish the invention to be restricted to the details of construction hereinafter set forth, as its application to depositing machines of various kinds can be effected without departing from the spirit of the invention.

15 designates the main frame of the machine and 16 denotes a support, such for example, as that set forth in my above mentioned Patent No. 1,121,430, provided with a series of superposed steps for initially feeding the cakes to be coated onto an endless carrier band 17 by which the cakes will be advanced in rows beneath the receptacle wherein is contained the material or materials to be deposited upon the surface of the cakes. The endless carrier band 17 will be suitably supported, as on on a table 18, so that the cakes will be raised and lowered to properly present them to the discharge nozzles at the bottom of the receptacle containing the material to be deposited (see Figs. 1, 5 and 6).

As shown, my invention is applied to a machine adapted to deposit on the cakes two kinds of material, such for example as marshmallow and chocolate, and the receptacle is therefore provided with a diaphragm or partition 19 dividing it into two chambers 20 and 21, the chamber 20 being for the marshmallow and the chamber 21 for the chocolate (see Figs. 4 and 8). The body portions of the chambers 20 and 21 are shown as a single casting and preferably around these chambers 20 and 21 extends a heating chamber 22 (see Fig. 4) to which steam or hot water will be admitted by a pipe 23 for keeping the materials within the chambers at the proper temperature. The bottom of the receptacle is shown as comprising a casting 25 having an opening extending substantially from end to end thereof, this bottom casting 25 being attached, as by bolts 26, to the lower part of the body portion of the receptacle. At its ends and adjacent its top, the receptacle for the coating materials is formed with projecting brackets 27 (see Figs. 2 and 7), whereby the receptacle is supported upon the sides of the main frame 15, and at the ends of the receptacle are formed lugs 28 that are perforated to receive certain parts, as will hereinafter more fully appear.

The end walls of the chambers 20 and 21 are formed with a series of vertical grooves to receive the ends of the partition or diaphragm 19 and other parts to be hereinafter described, and at the ends of the bottom portion of the chambers 20 and 21 (see Figs. 6 and 8) chambers are formed to receive blocks 30 having similar vertical grooves formed in their inner faces.

To the bottom casting 25 is attached a chambered die carrier plate 32 through which the coating materials will be discharged. As shown, the die carrier plate 32 has its longitudinal edges beveled (see Fig. 4), one of these beveled edges engaging a beveled lug 33 at the bottom of the casting 25 and the other of its beveled edges being engaged by the beveled inner edge of an adjusting plate 34. The adjusting plate 34 is supported beneath the casting 25 by a guard plate 35 and through the upturned end 36 of the adjusting plate 34 pass adjusting screws 37 that enter threaded sockets in the lower part of the casting 25. Beneath the beveled lug or rib 33 is placed a plate 38 that aids in more securely retaining the die carrier 32 in position.

In the chambered part of the die carrier 32 is mounted a plate 40 that extends lengthwise of the die carrier. This plate 40 extends upon both sides of the partition 19 and at one side of the partition the plate 40 is formed with a series of ports 41 for the passage therethrough of chocolate from the chamber 21. At the opposite side of the partition 19 the plate 40 is formed with a series of holes in which are fixed the upper ends of the discharge tubes 42 through which marshmallow from the chamber 20 will be discharged. Around each of the tubes 42 fits an annular part or valve 43 (see Figs. 4$^a$ and 8) which in the preferred form of the invention has a dual function to be presently described. To each of these annular parts 43 are attached the arms 44 of a rocking shifter bar 45 that extends lengthwise of the die carrier 32 and through one end thereof (see Fig. 9) and at its outer end the shifter bar 45 is provided with a crank arm 46 whereby the shifter bar may be rocked in order to raise and lower the parts or valves 43. The mechanism whereby the shifter bar 45 is operated is similar to that set forth in Letters Patent No. 1,121,431, granted to me December 15, 1914, and need not therefore be particularly described, although it may be noted in passing that this mechanism comprises a link connecting the arm 46 with the rock arm on the shaft 46$^a$, (see Fig. 3). Another rock arm 46$^b$ (see Fig. 10) is connected by a vertically disposed link to a rock arm 46$^c$ on a shaft 46$^d$ that carries at one end a rock arm provided with a friction sleeve engaging a cam 46$^e$ on the shaft 126 (see Fig. 1) that is keyed to the main drive shaft. The bottom of the die carrier 32 (see Figs. 4 and 4$^a$) is formed with a series of openings in which are fitted the nozzles 47 which surround the parts 43 and the tubes 42, the openings of the inclined lower ends of the nozzles 47 being of slightly greater diameter than the tubes 42 to afford an annular passage for the discharge of chocolate that will be delivered to the annular spaces between the nozzles 47 and the pipes 42 from the chocolate chamber 21. As shown, the lower end of each of the parts or valves 43 is formed with a reduced depending portion 48 and with a shoulder 49, the reduced annular portion 48 being adapted to enter the space between the lower end of the nozzle 47 and the corresponding tube 42 and clean out any obstruction that may be lodged therein when the parts 43 is lowered, while the inclined shoulder 49 will contact with the annular wall of the nozzle 47 and form a valve for completely cutting off the flow of chocolate at such point. Extending from end to end of the marshmallow chamber 20 is a plunger bar 50 that is preferably formed as a hollow casting. In the ends of this plunger bar 50 are formed vertical groves 51 (see Fig. 8) to receive guide strips 52 that insure the accurate vertical movement of the plunger bar 50. By reference more particularly to Figs. 2, 4 and 6 of the drawings, it will be seen that the plunger bar 50 is formed with upwardly extending arms 53, the upper ends of which have outwardly extending portions 54 that project over the end walls of the chamber 20. The lower end of the plunger bar 50 is beveled, as at 55 (see Fig. 4) to enable the plunger bar to more effectively discharge the marshmallow through the tubes 42. The preferred mechanism whereby the vertical reciprocation of the plunger bar 50 is effected will be hereinafter more fully described. It will be noticed that the plunger 50 is spaced at some distance from the central wall or diaphragm 19 of the confection chamber so that confection from the chamber can pass around the lower portion of the plunger between its inner vertical face and the wall or diaphragm 19, hence insuring a uniform, adequate supply of confection to be ejected from the discharge openings.

At one side of the plunger bar 50 is arranged a vertical gate or valve 60, the lower end of which is adapted to move in close relation to the raised seat or shoulder 61 (see Fig. 4) that extends longitudinally of the bottom casting 25. In order to guide the gate 60 it is preferred to attach thereto the dovetail ribs 62 (see Fig. 2) that move in correspondingly dovetail grooves formed in the outer wall of the plunger bar 50. To the ends of the valve or gate 60 are connected vertical bars 63 (see Figs. 7 and 8) to the upper ends of which are secured brackets 64 with which will connect the mechanism to be hereinafter described, whereby the vertical reciprocation of the bar or gate 60 will be effected.

Between the plunger bar 50 and the partition 19 and immediately above the row of discharge tubes 42 for the marshmallow are arranged the plunger rods 65 (see Figs. 2, 4, 5 and 8) the upper ends of which are secured in a vertical slide bar 66, to the ends of which are attached the vertical bars 67. To the upper ends of the bars 67 are secured the laterally projecting arms 68 to which will be connected the means hereinafter described, whereby the vertical reciprocation of the plunger rod 65 will be effected. The lower ends of the plunger rods 65 pass through a guide bar 69 (see Fig. 5) that extends from end to end of the bottom casting 25. At one end the guide bar 69 is formed with a threaded reduced portion that projects outside of the casting 25 and is engaged by a correspondingly threaded nut, while the opposite end of the guide bar 69 fits snugly through an opening at the opposite end of the casting 25. By moving the threaded nut from the reduced end of the bar 69, the bar can be withdrawn after the plunger rods 65 have been raised from engagement therewith.

The mechanism whereby the vertical reciprocation of the plunger bar 50, the valve or gate 60 and the plunger rods 65 is effected to cause the discharge of the marshmallow onto the cakes to be coated, will be so relatively timed that the preferable operation of these parts will be as follows: Assuming the plunger bar 50 and the gate or valve 60 to be in raised position, i. e., the position opposite that shown in Fig. 4, the marshmallow from the chamber 20 will fill the space below the ends of the plunger bar and plunger rods. Then if a row of cakes be brought beneath the discharge tubes 42, as indicated in Fig. 4 of the drawings, and the carrier band 17 be raised towards the discharge nozzles in the usual way, the gate or valve 60 will be first lowered to the position shown in Fig. 4 so as to cut off the supply of marshmallow from the chamber 20. As the gate is about to close, the plunger bar 50 will descend and will force the marshmallow beneath it downward and through the tubes 42. As the plunger bar 50 completes its stroke, the plunger rods 65 will descend into and substantially through the tubes 42 and will force the marshmallow therein to discharge onto the subjacent cakes. The row of cakes just coated, after the chocolate has been applied as hereinafter described, will then be advanced by the carrier band 17 after it has been moved to its lowermost position and at the same time the plunger rods 65, the plunger bar 50 and the gate or valve 60 will be raised to permit the marshmallow to again flow downward into the space beneath these parts and into the tubes 42. The plunger rods 65 not only serve to eject the marshmallow from the tubes 42, but also serve at the time to cut off any further supply of marshmallow through the tubes. It will be understood that while marshmallow is thus being delivered onto the cakes W, a coating of chocolate will be applied to the marshmallow and this will be accomplished by the mechanism next to be described.

Within the chocolate chamber 21 and extending from end to end thereof is arranged a plunger bar 70 having its lower end preferably beveled as at 71. The ends of this plunger bar are provided with vertical guide grooves to receive guide bars 72 that are held in suitable channels formed in the end walls of the chamber 21. The construction of this plunger bar 70 is substantially the same as that of the plunger bar 50 hereinbefore described, and from the ends of the plunger bar 70 extend the vertical arms 73 having lateral lugs or extensions 74 that project outwardly over the ends of the chamber 21 (see Figs. 2, 3, 4 and 8). These lugs 74 will be connected with means whereby the vertical reciprocation of the plunger bar 70 will be effected, as will be hereinafter more fully described.

In the outer face of the plunger bar 70 (see Fig. 8) is formed a series of dovetail vertical channels 75 that receive the corresponding dovetail strips 76 secured to the vertically disposed gate or valve 77 that extends from end to end of the chamber 21. The lower edge of the gate 77 cooperates with an upstanding shoulder or seat 78 formed longitudinally of the casting 25 (see Fig. 4) and to the ends of this gate or valve 77 are fastened the vertical bars 79 to the upper ends of which are secured the outwardly projecting arms or brackets 80 that extend over the end walls of the chamber 21 and connect with the means to be presently described, whereby the reciprocation of the gate 77 will be effected. Between the inner face of the plunger bar 70 and the partition 19 is mounted a vertically movable gate or valve 81 the lower edge of which cooperates with a seat or shoulder 82 extending longitudinally of the bottom casting 25 (see Fig. 4); and to the ends of this gate or valve 81 are connected the vertical bars 83 to the upper ends of which are fastened the laterally projecting arms or brackets 84 (see Fig. 2) that extend over the end walls of the chamber 21 and connect with the means (to be presently described) whereby the reciprocation of the gate or valve 81 will be effected. Preferably, a bar 85 extends across and is secured to the upper edge of the gate 81 and moves therewith. A bar 86 extending from end to end of the chamber 21 near its bottom and between the partition 19 and the gate or valve 81, serves as a guide for the lower portion of the gate or valve 81. The discharge of the chocolate or other material from the chamber 21 is effected by the mechanism last described, in the following manner:

Assuming that the plunger bar 70, the gate or valve 77 and the gate or valve 81 are in raised position, chocolate will fill the space beneath these parts and passing through the holes or channels 41, will fill the annular spaces between the marshmallow tubes 42 and the nozzles 47. At such time the annular parts or valves 43 (see Figs. 4 and 4ª) will be in raised position. After a row of cakes W has been brought beneath the discharge nozzles 47 to receive their coating of marshmallow and chocolate, as indicated in Fig. 4, the gate or valve 77 will first be caused to descend, cutting off the flow of chocolate from the chamber 21 at the valve seat 78. The plunger bar 70 will then be caused to descend and will eject the chocolate from the chamber beneath it through the ports 41 and through the annular spaces within the nozzles 47 down onto and around the marshmallow which at the same time is being delivered onto the cake W. As the plunger 70 reaches the end of its downward stroke, the gate or valve 81 will descend against the seat 82, thus cutting off any further flow of chocolate at such point, and at the same time the annular parts or valves 43 will be caused to descend by the rocking of the bar 45 so as to cut off the flow of chocolate at the mouth of the discharge nozzles 47 and so as to cause the reduced portions 48 of the parts or valves 43 to clean out the annular channels between the tubes 42 and the nozzles 47. When the coating of chocolate has thus been delivered on top of and around the streams of marshmallow passing through the tubes 42 and the carrier band 17 and table 18 have been lowered, further dripping or excess discharge of the chocolate will be prevented, thus insuring a smooth and uniform coating of the confection deposit upon the cakes.

The preferred mechanism for operating the valves or gates, plunger bars and plungers in the marshmallow and chocolate chambers will next be described. Through the lug 54 that extends laterally from the upper end of one of the arms 53 of the plunger valve 50 (see Fig. 6) passes a threaded rod 90 having nuts upon its upper end to hold it in proper relation to the lug 54 and having a shoulder 91 whereon the lug 54 rests. The lower end of this rod 90 is threaded to engage a correspondingly threaded sleeve 92 (see Figs. 1, 3 and 6) having a bifurcated lower portion that is connected by a bolt 93 to the upper end of a link 94, the lower end of which link is pivotally connected, as at 95, to the bifurcated end of a rock arm 96 that is fixed to the rock shaft 97, this rock shaft being held in suitable bearings at the ends of the marshmallow chamber 20. On the opposite end of the rock shaft 97 (see Fig. 12) is fixed a rock arm 98, to the bifurcated upper end of which is pivotally connected, as at 99, the lower end of a link 100, the upper end of which is pivotally connected, as at 101 (see Fig. 6) to the lower end of the threaded sleeve 102 which engages the lower end of a threaded rod 103 corresponding to the rod 90 at the opposite side of the machine passing through a laterally projecting lug 54 at the upper end of the corresponding vertical bar 53 that extends from the plunger bar 50. To the rock arm 98 (see Fig. 12) is pivotally connected, as at 105, the upper end of a sectional connecting bar 106, the lower end of which is pivotally attached, as at 107, to an adjustable block 108 that is mounted to slide within the chambered end portion of a rock arm 109. Through the block 108 is formed a threaded opening through which passes the threaded end of an adjusting screw 110 that passes through the end of the rock arm and is held in relation thereto by a collar 111 pinned to the adjusting screw. The adjusting screw is provided at its outer end with a hand wheel 112 whereby it may be turned in order to move the slide block 108 back and forth within the chamber of the rock arm 109. The rod 106 is preferably formed of threaded sections united together by a turnbuckle 113 for accurate adjustment. By shifting the slide block 108, the adjustment of the throw of the plunger bar 50 can be effected. The rock arm 109 is pivotally mounted upon a stud 115 that projects from one of the side bars of a supplemental frame 116 that is bolted to the side bars of the main frame (see Fig. 11), and one end of this rock arm is provided with a pin 117 having a friction sleeve 118 that works within a cam groove formed in a cam wheel 120 fixed to the shaft 121. This shaft 121 extends from side to side of the main frame (see Figs. 1 and 11) and has fixed thereon a gear wheel 122 that meshes with a pinion 218 (see Fig. 1) on a shaft 219 and this pinion 218 in turn meshes with a gear wheel 125 on a shaft 126 mounted on the main frame, the gear wheel 125 meshing with a pinion 127 on the main drive shaft 128.

In order to easily effect a slight variation or adjustment in the movement of the plunger 50, and preferably, also, cushioning the movement of said plunger, I prefer to provide the means next to be described, reference being had more particularly to Figure 6 of the drawing. Through the arms or extensions 54 at the top of the arm 53 are formed openings through which freely pass the rods 130, the lower ends of which pass through openings 131 formed in the end flanges at the top of the chamber 20. The central portions of these rods 130 are threaded to engage the blocks 132 adapted to bear upon the upper edges of the end walls of the chamber 20. Stout coil springs 133 encircle the rods 130 between the blocks 132 and the sleeves 134 that are mounted on the upper portions of said rods. These sleeves 134 are exteriorly threaded to engage threaded openings 135 in the arms or extensions 54. By adjusting the sleeves 134, the force of the springs 133 can be regulated. It will thus be seen that as the plunger quickly descends, the blocks 132 will contact with the end walls of the chamber 20 and as the plunger completes its downward movement, the springs 133 will be compressed, thus taking off the shock of the closing movement of the plunger 50, as the rods 130 slide freely through the sleeves 134. It will be noted that a portion of each of the threaded rods 90 passes freely through an opening formed in the corresponding lug or extension 54 and the plunger arm 53 and the nuts mounted upon the upper end of each of the rods 90 can be so adjusted that the distance between the lowermost nut and the shoulder 91 of the rod 90 will be greater than the vertical thickness of the extension 54 through which the rod 90 passes. By this means, a variable "lost motion" movement can be given to the plunger 50, the extent of this lost motion movement being determined by the position of the nuts upon the upper ends of the rods 90. By this means, the movement of the plunger 90 can be accurately timed to compensate for any variations in the cam mechanism whereby the plunger 50 is actuated or for other purposes.

The preferred mechanism for operating the gate or valve 60 in the marshmallow chamber 20 will next be described. To the bracket 64 at the upper end of one of the vertical bars 63 (see Fig. 7) is connected the upper end of a bolt 140, the lower threaded end of which enters the threaded upper end of a link 141 (see Fig. 3) that is pivotally connected at its lower end to a rock arm 142 journaled on a stud 143 projecting from one end of the marshmallow chamber 20. To this rock arm 142 is connected the upper end of a link 144 the lower end of which is pivoted to a bell crank lever 145 that is journaled on a shaft 146. The lower arm of the bell crank lever 145 is pivotally connected to a rod 147 (see Fig. 1) that is adjustably connected to the slotted upper end of a rock arm 148 that is fixed to the shaft 149 that is journaled in the main frame of the machine. To this shaft 149 is connected a rock arm 150 provided with a laterally projecting pin 151 carrying a roller that works in the groove of a cam 152 that is fixed to the shaft 153. This shaft 153 is journaled in one side of the main frame (see Fig. 10) and at its opposite end in a bar 154 that is secured at its end to side bars extending between the sides of the main frame. Upon the shaft 153 is fixed a gear wheel 155 that meshes with a pinion 156 upon the cross shaft 126ª. The rock shaft 146 has fixed to its opposite end a rock arm 157 (see Fig. 10) to the free end of which is pivotally connected the lower end of a rod 158. The upper end of this rod is pivotally connected (see Fig. 7) to a rock arm 159 that is mounted upon a stud 160 projecting from the end wall of the chamber 20, and the free end of this rock arm 159 is pivotally connected to the lower end of a rod 161 that is interiorly threaded at its upper end to engage the lower threaded end of a rod 162 that is connected to the lateral extension 64 at the top of the gate arm 63. Hence it will be seen that when the cam 152 is revolved by the main drive shaft, a reciprocating motion will be imparted by the mechanism last described to the gate 60 within the marshmallow chamber, and by the means above described, the throw of the gate can be accurately determined.

The vertical reciprocating motion of the plunger rods 65 is effected by mechanism next to be described: To the upper ends of the vertical arms 67 at the ends of the plunger rod carrier 66 are connected the rods 170 and 171. The lower end of the rod 170 is threaded into the upper end of a rod 172 that is pivotally connected at its lower end by a link 173 (see Figs. 1, 3 and 5) to a rock arm 174 that is keyed to the rock shaft 175. This rock shaft 175 extends from side to side between the walls of the chamber 20 wherein it is journaled and at its opposite end this shaft 175 has keyed thereon a rock arm 176 (see Fig. 5) the free end of which is pivotally connected to the lower end of a link 177 the upper end of which is pivotally connected, as at 178, to the lower end of a rod 179, the interiorly threaded end of which engages the lower end of the threaded rod 171. To the rock arm 174 (see Fig. 3) is pivotally connected, as at 180, the upper end of a sectional rod 181 the sections of which are united by a turnbuckle 182, and the lower end of this sectional rod 181 is pivotally connected to a slide block 183 that is mounted in the chambered end of a rock arm 184. Through the slide block 183 passes the adjusting screw 185 that passes through the end of the rock arm 184 and is provided with a hand wheel 186 whereby the slide block 184 can be adjusted to regulate the throw of the plunger rods 65. This rock arm 184 is journaled upon a stud 187 that projects from one of the side bars 116 (see Fig. 11) of the supplemental frame, and the free end of the rock arm 184 carries a projecting pin provided with a sleeve 188 that works in the groove of a cam 189 that is mounted upon the shaft 121. The shaft 121 is geared to the main drive shaft as above described, and it will be seen that when revolution is imparted to the cam 189, the reciprocation of the plunger rods 65 will be accomplished through the connections hereinbefore described, causing the lower ends of these rods to enter the tubes 42 and eject the marshmallow therefrom.

The vertical reciprocation of the plunger 70 within the chocolate chamber 21 is effected by mechanism very similar to that hereinbefore described, by which the reciprocation of the plunger 50 in the marshmallow chamber is accomplished. To the upper ends of the vertical arms 73 at each end of the plunger bar 70 are connected rods 200 (see Fig. 3) that pass through the lateral arms 74 at the upper ends of the bars 73, the lower threaded ends of the bars 200 being engaged by the upper ends of links 201 at the opposite ends of the chamber 21. One of the links 201 (see Fig. 3) is pivotally connected at its lower end to a link 202 that is pivoted to the free end of a rock arm 203 that is keyed to a shaft 204 extending from end to end of the chocolate chamber 21 and journaled in the end walls thereof. Upon the opposite end of this shaft 204 (see Fig. 12) is a similar rock arm 205, the free end of which is connected to a link 206 that is attached to the corresponding end of the plunger bar 70 by connections similar to those last described for connecting the opposite end of the bar to the rock shaft 204. Preferably, means are provided for cushioning the movements of the plunger bar 70, similar to the means hereinbefore described for cushioning the movement of the plunger bar 50 in the marshmallow chamber, but I have not deemed it necessary to repeat in the drawings the illustration of these cushioning devices.

To the rock arm 205 (see Fig. 12) is connected the upper end of a sectional rod 207 the parts of which are adjustably united by a turnbuckle 208. The lower end of the sectional rod 207 is pivotally connected to a slide block 209 that is mounted within the chambered end of a rock arm 210. Through the slide block 209 passes the adjusting screw 211 that passes through the end of the rock arm 210 and is provided at its outer end with a hand wheel 212. By adjusting the screw 211, the position of the slide block 209 may be varied to adjust the throw of the plunger bar 70. The rock arm 210 is journaled upon a stud 213 (see Fig. 12) projecting from the side bar of the supplemental frame 116 (see Fig. 1) and the forward end of this rock arm 210 is provided with a pin carrying a roller 214 working in the groove of a cam 215 that is mounted upon the shaft 216. Upon the shaft 216 is keyed a gear wheel 217 (see Fig. 1) that meshes with a pinion 218 on a shaft 219. This pinion 218 meshes with the gear wheel 125 on the shaft 126 which is driven from the drive shaft 128. When revolution is imparted to the cam 215, vertical reciprocation will be given to the plunger bar 70 through the connections hereinbefore described, the accurate movement of the plunger bar being regulated by the adjusting screw 211.

The means whereby the movement of the gate or valve 77 in the chocolate chamber 21 is effected will next be described. This mechanism is very similar to the mechanism hereinbefore described, whereby the reciprocation of the gate or valve 60 within the marshmallow chamber 21 is effected. To the upper ends of the lateral extensions 80 at the tops of the vertical bars 79 at the end of the gate or valve 77 (see Figs. 1, 2, 3 and 4) are connected the threaded rods 220 that are threaded to engage the upper ends of the rods 221 that are pivotally connected to the rock arms 222 that are journaled on studs 223 projecting from the end walls of the chocolate chamber 21. To the rock arms 222 at one side of the machine is pivotally connected the upper end of a rod or pitman 224, the lower end of which is pivotally connected (see Fig. 3) to the rock arm 225 on the rock shaft 226 that extends from side to side of the main frame of the machine. The rock arm 227 on this rock shaft 226 has connected thereto a rod 228 (see Fig. 10) that extends forwardly and is pivotally connected to the slotted upper end of a rock arm 230 on the rock shaft 149 that is oscillated from the cam 152 on the shaft 153, and is driven in a manner hereinbefore described. That is to say, the cam 152 that operates the gate or valve 60 in the marshmallow chamber also operates the gate or valve 77 in the chocolate chamber.

The mechanism whereby the supplemental gate or valve 81 in the chocolate chamber is operated will next be described, reference being had more particularly to Figs. 1, 2, 3, 4 and 10 of the drawings: To the arms 84 that project laterally from the tops of the bars 83 at the ends of the gate or valve 81 are connected the threaded rods 240, the threaded lower ends of which engage rods 241 that are pivotally connected at 242 to the links 243, the lower ends of which links are pivoted to the upper ends of the rock arms 244 keyed to the rock shaft 245 (see Fig. 3) that extends from end to end of the chocolate chamber and is journaled in the side walls thereof. To one of the rock arms 244 is pivotally connected a sectional rod 246 the sections of which are united by a turnbuckle 247. The lower end of the rod 246 is pivotally connected to a slide block 248 that is mounted within the chambered portion (see Fig. 1) of a rock arm 249. A set screw 250 passing through the slide block 248 and the rock arm 249 and provided with a hand wheel 251, serves to adjust the slide block 248 to vary the throw of the gate or valve 81. The rock arm 249 is pivotally mounted upon a stud 252 depending from one of the sides of the supplemental frame 116, and the forward end of this rock arm 249 is provided with a projecting friction roller 254 working in a groove in a cam 255 (see Figs. 1 and 10).

Having thus described my invention, what I claim as new and desire to secure by Letters Patent is—

1. A depositing machine comprising a chamber for confection provided at its bottom with a row of vertically disposed discharge openings, a long, movable plunger located within said chamber, both of the vertical side walls of said plunger being spaced at a distance from the corresponding vertical walls of said chamber to permit free access of confection to the opposite sides of said plunger, valve mechanism within said chamber and at one side of said plunger to check the flow of confection beneath said plunger, and means for operating said valve mechanism and said plunger in timed relation.

2. A depositing machine comprising a chamber for confection provided at its bottom with a plurality of discharge openings and having formed at one side of said discharge openings a long seat, a vertically movable gate or valve extending substantially from end to end of said chamber and adapted to cooperate with said seat to check the flow of confection to said discharge openings, a vertically movable plunger extending substantially from end to end of said chamber between said gate and said discharge openings, both of the vertical side walls of said plunger being spaced at a distance from the vertical walls of the chamber to permit free access of confection to the opposite walls of the plunger, and means for reciprocating said gate and plunger in timed relation.

3. A depositing machine comprising a chamber for confection provided at its bottom with a plurality of discharge openings and having formed at its bottom at one side of said discharge openings a long raised seat, a vertically movable gate or valve extending substantially from end to end of said chamber and adapted to cooperate with said raised seat, a plunger extending substantially from end to end of said chamber between said gate and said discharge openings, a plurality of plunger rods arranged above said discharge openings, and means for reciprocating said gate, said plunger and said plunger rods in timed relation.

4. A depositing machine comprising chambers for different confections provided at their bottoms with a series of vertically disposed discharge openings, long, vertically and independently movable plungers extending substantially from end to end of said chambers, a series of vertically movable plunger rods arranged above said discharge openings at the side of one of said plungers, and mechanism for vertically reciprocating said plunger and plunger rods.

5. A depositing machine comprising a chamber for confection provided at its bottom with a plurality of discharge openings and having at its bottom and at one side of said discharge openings a long seat, a vertically movable gate or valve extending substantially from end to end of said chamber and adapted to cooperate with said seat to cut off the flow of confections to said openings, a plunger extending substantially from end to end of said chamber between said gate and said discharge openings, a plurality of plunger rods arranged at the inner side of said plunger and above said discharge openings, and means for reciprocating said gate, said plunger and said plunger rods in timed relation.

6. A depositing machine comprising a chamber for confection provided at its bottom with a plurality of discharge openings and having formed at its bottom at one side of said discharge openings a raised portion provided at a distance from its inner edge with a longitudinally raised seat, a vertically movable gate or valve extending substantially from end to end of said chamber and adapted to cooperate with said raised seat, a plunger extending substantially from end to end of said chamber above said raised portion and inside said raised seat whereby the bottom face of said plunger cooperates with said raised portion beneath it in expelling the confection, and means for reciprocating said gate and said plunger in timed relation.

7. A depositing machine comprising chambers for different confections provided at their bottoms with discharge openings and with valve seats extending across said bottoms, long, vertically movable plungers arranged within and extending transversely of said chambers, the vertical side walls of both of said plungers being spaced at a distance from the vertical wall of the chamber between said plungers to permit free access to confection to the opposite vertical sides of the plunger, vertically movable reciprocating gates or valves arranged adjacent the outer sides of said plungers and adapted to engage said valve seats, and mechanism connected to said plungers and said gates or valves and adapted to reciprocate the same in timed relation.

8. A depositing machine comprising chambers for different confections provided at their bottoms with discharge openings and with a valve seat extending across the bottom of one of said chambers, a vertically movable plunger extending transversely of said chamber and above the space between said valve seat and said openings, a vertically movable valve or gate arranged at one side of said plunger and adapted to engage said valve seat, dovetail connections between said valve or gate and the side of said plunger, means within the other chamber for controlling the flow of material therefrom, a mechanism connected to said plunger and said valve or gate for reciprocating the same.

9. A depositing machine comprising a vessel for holding the confection to be deposited and provided at its bottom with a row of vertical discharge openings, a valve seat extending across the bottom of said vessel, a vertically movable plunger extending transversely of said vessel at one side of said openings, a vertically movable valve or gate arranged at one side of said plunger and adapted to engage said valve seat, a series of vertically movable plunger rods arranged at the opposite side of said plunger, and mechanism connected to said plunger, said valve or gate and said plunger rods, for reciprocating said parts in timed relation.

10. A depositing machine comprising chambers for different confections provided at their bottoms with discharge openings and with horizontal portions and vertical valve seats adjacent said discharge openings, vertically movable valves arranged to cooperate with said valve seats, vertically movable plungers arranged between said valves and said discharge openings and above said horizontal portions of the bottom of the chambers, and mechanism connected to said plungers and said valves to reciprocate the same in timed relation.

11. A depositing machine comprising chambers for different confections provided at their bottoms with discharge openings and with horizontally raised portions and vertical valve seats adjacent said discharge openings, vertically movable valves arranged to cooperate with said valve seats, vertically movable plungers arranged between said valves and said discharge openings, the bottoms of said plungers extending over said raised portions to cooperate therewith in expelling the confections, and mechanism connected to said plungers and said valves to reciprocate the same in timed relation.

12. A depositing machine comprising a vessel provided at its bottom with a row of discharge openings, a vertically movable plunger extending transversely of said vessel adjacent said discharge openings, operating mechanism connected to and adapted to reciprocate said plunger, said operating mechanism having means for imparting a variable extent of lost motion to said plunger.

13. A depositing machine comprising a vessel provided at its bottom with a row of discharge openings, a long vertically movable plunger extending transversely of said vessel adjacent said discharge opening, operating mechanism connected to and adapted to reciprocate said plunger, and means for cushioning the stroke of said plunger.

14. A depositing machine comprising chambers for different confections provided at their bottoms with discharge openings, discharge nozzles arranged below said discharge openings, said discharge nozzles comprising outer portions and tubes of smaller diameter located therein, the openings in one of said chambers communicating with said tubes and the openings of the other of said chambers communicating with the space between said tubes and the outer portions of said nozzles, a series of plunger rods the lower ends of which correspond substantially in diameter to the diameter of said tubes, and means for vertically reciprocating said plunger rods to force the material through said tubes.

15. A depositing machine comprising chambers for different confections provided at their bottoms with discharge openings, a vertically movable plunger extending transversely of one of said chambers, a series of vertically movable plunger rods arranged above the openings at the bottom of said chamber, and at one side of said plunger, means located above said openings for guiding the lower ends of said plunger rods, and mechanism connected to said plunger and said plunger rods for vertically reciprocating the same.

16. A depositing machine comprising a vessel having chambers for different confections provided at its bottoms with discharge openings, a vertically movable plunger extending transversely of one of said chambers, a series of vertically movable plunger rods arranged above the openings at the bottom of said chamber, a perforated bar extending transversely of said chamber above said openings for guiding the lower ends of said plunger rods, said bar being removably held within said chamber, and mechanism connected to said plunger and said plunger rods for vertically reciprocating the same.

FREDERICK WESTERMAN.